US012794867B2

(12) United States Patent
Chinthagunta et al.

(10) Patent No.: US 12,794,867 B2
(45) Date of Patent: Nov. 10, 2026

(54) SYSTEM AND METHOD FOR FIELD-LEVEL ENCRYPTION USING MULTIPLE GROUPS OF DATA ENCRYPTION KEYS

(71) Applicant: Optum, Inc., Minnetonka, MN (US)

(72) Inventors: Sumanth Chinthagunta, Riverside, CA (US); Radha Satyavani R Kandikattu, Hyderabad (IN); Chappidi Likhitha, Tirupati (IN); A Gokul, Chennai (IN)

(73) Assignee: Optum, Inc., Minnetonka, MN (US)

(*) Notice: Subject to any disclaimer, the term of this patent is extended or adjusted under 35 U.S.C. 154(b) by 29 days.

(21) Appl. No.: 18/956,334

(22) Filed: Nov. 22, 2024

(65) Prior Publication Data

US 2026/0149702 A1 May 28, 2026

(51) Int. Cl.
*G06F 7/04* (2006.01)
*G06F 21/62* (2013.01)
*H04L 9/08* (2006.01)
*H04L 9/40* (2022.01)

(52) U.S. Cl.
CPC ...... *H04L 63/0457* (2013.01); *G06F 21/6245* (2013.01); *H04L 9/0822* (2013.01)

(58) Field of Classification Search
CPC . H04L 63/0435; H04L 9/0822; H04L 9/0819; H04L 63/0457; G06F 21/6245
See application file for complete search history.

(56) References Cited

U.S. PATENT DOCUMENTS 8,867,741 B2 10/2014 McCorkindale et al.
11,698,981 B2 7/2023 White et al.
12,216,680 B1 * 2/2025 Wahid ................. G06F 16/2358
2004/0081332 A1 * 4/2004 Tuttle ..................... G06V 30/40 382/100
2016/0358013 A1 * 12/2016 Carter ..................... G06F 21/32
2018/0013562 A1 1/2018 Haider et al.
2018/0254892 A1 * 9/2018 Egorov ................. H04L 9/0891
(Continued)

FOREIGN PATENT DOCUMENTS

WO 2018208787 A1 11/2018

OTHER PUBLICATIONS

Rabah, Theory and Implementation of Data Encryption Standard: A Review, 2005, ResearchGate, pp. 307-325. (Year: 2005).*
(Continued)

*Primary Examiner* — Philip J Chea
*Assistant Examiner* — Jenise E Jackson
(74) *Attorney, Agent, or Firm* — Bookoff McAndrews, PLLC

(57) ABSTRACT

Systems and methods for field-level encryption using multiple groups of data encryption keys are provided. Multi-device keys for encrypting a message may be received. The multi-device keys may include (1) a first data encryption key (DEK) from among a first group of DEKs that permits a first consuming device to access a first field of the message and (2) a second DEK from among a second group of DEKs that permits a second consuming device to access a second field of the message. The message may be encrypted by encrypting (1) the first field using the first DEK and (2) the second field using the second DEK. The encrypted message may be transmitted to a stream processing platform to permit (1) the first consuming device to decrypt the first field and (2) the second consuming device to decrypt the second field.

20 Claims, 7 Drawing Sheets

(56) References Cited

U.S. PATENT DOCUMENTS

| | | | | |
|---|---|---|---|---|
| 2019/0065881 | A1* | 2/2019 | Zucker | G06V 20/53 |
| 2024/0086335 | A1* | 3/2024 | Kaufman | G06F 21/602 |
| 2024/0104881 | A1* | 3/2024 | Finatti | G06V 10/25 |

OTHER PUBLICATIONS

Oladoyinbo et al., The Importance of Data Encryption Algorithm In Data Security, Apr. 2024, ACM, pp. 10-16. (Year: 2024).*
"Hierarchical Key Rotation. Should I rotate the lowest level keys?," Stack Exchange, published on Jan. 17, 2021, retrieved from https://security.stackexchange.com/questions/243425/hierarchical-key-rotation-should-i-rotate-the-lowest-level-keys (4 pages).
Amazon CloudFront, "Use field-level encryption to help protect sensitive data," aws, no date but published before Nov. 22, 2024, retrieved from https://docs.aws.amazon.com/AmazonCloudFront/latest/DeveloperGuide/field-level-encryption.html (22 pages).
Anonymous, "I want to bind ciphertext to its context," Tink Cryptographic Library, published on Jul. 10, 2023, retrieved from https://developers.google.com/tink/bind-ciphertext (1 page).
Grahsl, "End-to-end field-level encryption for Apache Kafka Connect," Red Hat Developer, published on Sep. 27, 2022, retrieved from https://developers.redhat.com/articles/2022/09/27/end-end-field-level-encryption-apache-kafka-connect (14 pages).
Mazalon, "Complete Guide to Salesforce Shield," Salesforce Ben, published on Aug. 31, 2022, retrieved from https://www.salesforceben.com/salesforce-shield (11 pages).
Salter, "MongoDB's field-level encryption protects private data—even from DBAs," ars Technica, published on Apr. 1, 2020, retrieved from https://arstechnica.com/information-technology/2020/04/mongodbs-field-level-encryption-protects-private-data-even-from-dbas (6 pages).
Thales, "CipherTrust Live Data Transformation Zero-Downtime Encryption and Key Rotation," Thales, published Jul. 2021, retrieved from https://cpl.thalesgroup.com/sites/default/files/content/product_briefs/field_document/2022-08/ciphertrust-live-data-transformation-pb.pdf (2 pages).

* cited by examiner

SYSTEM AND METHOD FOR FIELD-LEVEL ENCRYPTION USING MULTIPLE GROUPS OF DATA ENCRYPTION KEYS

TECHNICAL FIELD

The present disclosure relates, generally, to the field of data security and cryptography. More particularly, the present disclosure relates to encryption and decryption techniques for messaging between producing devices and consuming devices that utilize a stream processing platform.

BACKGROUND

A stream processing platform can permit messaging between producing devices and consuming devices. For example, a producing device can generate a message, and transmit the message to the stream processing platform. The stream processing platform can store the message, and permit the consuming device to receive the message.

In some cases, an organization associated with a producing device might desire to enhance security of the messages provided to the stream processing platform. For instance, the stream processing platform can store messages that are not encrypted. In these cases, a nefarious party might gain access to the stored messages, which can potentially expose sensitive information of individuals associated with the messages. In other cases, an organization associated with a producing device might desire to limit accessibility of various content of a message.

SUMMARY

It can be understood that both the foregoing general description and the following detailed description are explanatory only and are not restrictive of the disclosure, as claimed.

According to an aspect, a computer-implemented method may include receiving, by the one or more processors, multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message; encrypting, by the one or more processors, the message by encrypting (1) the first field using the first DEK and (2) the second field using the second DEK; and transmitting, by the one or more processors, the encrypted message to a stream processing platform to permit (1) the first consuming device to decrypt the first field and (2) the second consuming device to decrypt the second field.

According to another aspect, system may include one or more processors; and one or more memories storing processor-executable instructions that, when executed by the one or more processors, cause the one or more processors to perform operations comprising receiving multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message; encrypting the message by encrypting (1) the first field using the first DEK and (2) the second field using the second DEK; and transmitting the encrypted message to a stream processing platform to permit (1) the first consuming device to decrypt the first field and (2) the second consuming device to decrypt the second field.

According to another aspect, one or more non-transitory computer-readable media may store processor-executable instructions that, when executed by one or more processors, cause the one or more processors to perform operations comprising: receiving multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message; encrypting the message by encrypting (1) the first field using the first DEK and (2) the second field using the second DEK; and transmitting the encrypted message to a stream processing platform to permit (1) the first consuming device to decrypt the first field and (2) the second consuming device to decrypt the second field.

DETAILED DESCRIPTION

Figure 1:
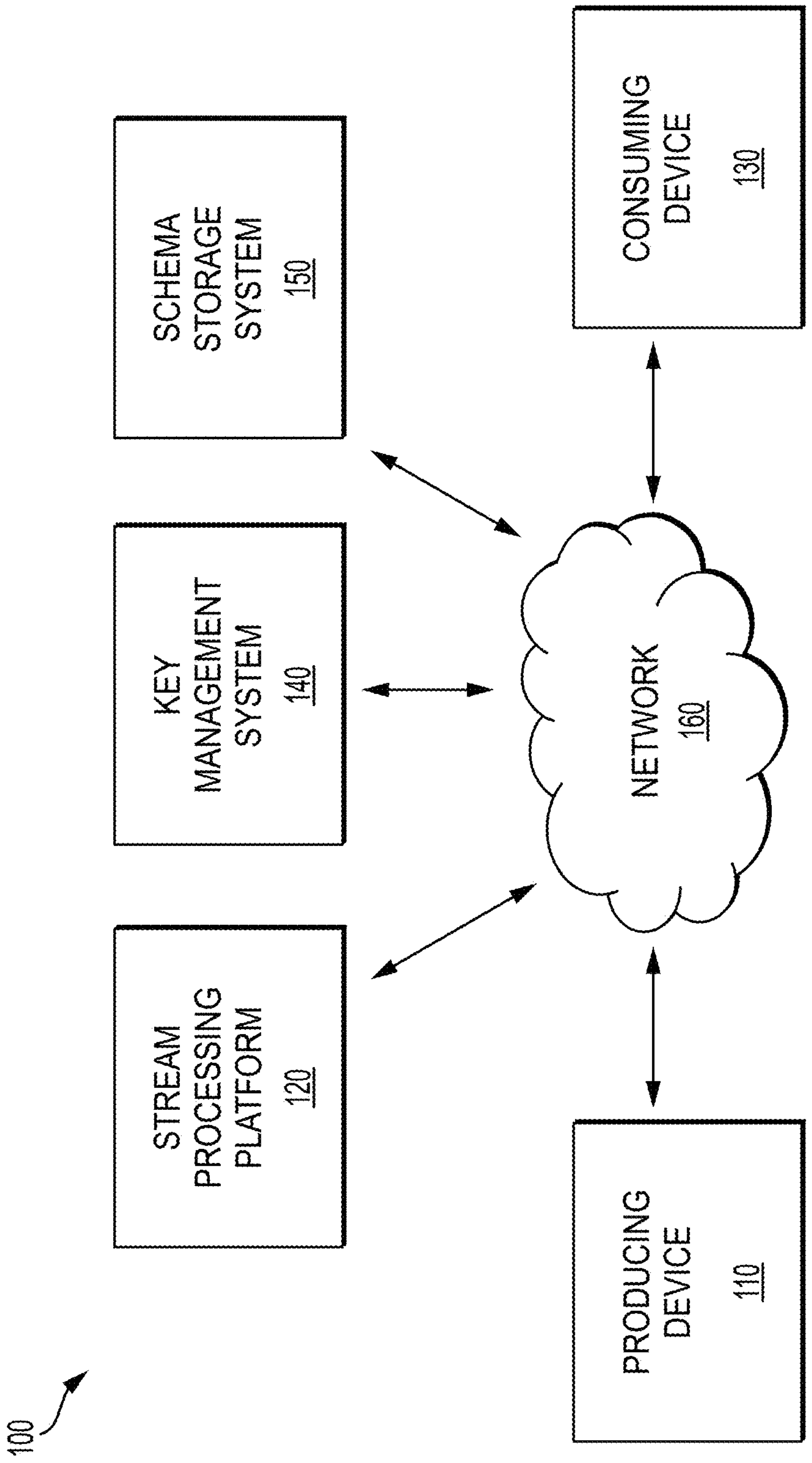
FIG. 1 is a diagram of an example system for field-level encryption and decryption of messages using multiple groups of DEKs.

The present disclosure relates to encryption and decryption techniques for messaging between producing devices and consuming devices that utilize a stream processing platform.

As addressed above, a producing device might generate a message including a set of fields to be transmitted to various consuming devices via a stream processing platform. As further addressed above, the stream processing platform can store the message that is not encrypted, and each consuming device might have access to all of the fields of the message. In these cases, the security of the message might be compromised, the contents of the message can be overly disseminated, or the like.

In the medical domain, as a particular example, the foregoing concerns might be especially acute because an organization (e.g., an insurer) might share different parts of protected health information (PHI) records or personally identifiable information (PII) records with multiple parties. Permitting a stream processing platform to store such information in a non-encrypted state and/or permitting access of all of the underlying information to each consuming party might increase the risk of sensitive information being compromised, being inappropriately accessed, or the like.

Accordingly, a need exists for techniques for improving the security of messages stored by a stream processing platform and for permitting access to various fields of messages on a consuming device basis.

One or more embodiments of the present disclosure improve the security of such messages and more appropriately allow and restrict access to particular fields of the messages by using field-level encryption using multiple groups of DEKs that respectively allows access to various portions of fields of the messages, leading to a technical improvement in the field of data security and cryptography. Specifically, the field-level protections can encrypt and securely send specific pieces of sensitive data to targeted parties while hiding the sensitive data from other parties.

According to an embodiment, a producing device can receive multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message. Further, the producing device can encrypt the message by encrypting (1) the first field using the first DEK and (2) the second field using the second DEK. Further, the producing device can transmit the encrypted message to a stream processing platform to permit (1) the first consuming device to decrypt the first field and (2) the second consuming device to decrypt the second field.

According to an embodiment, the stream processing platform can receive the encrypted message including the encrypted first field and the encrypted second field from the producing device, and store the message. In this way, even if a nefarious party accesses the message, the nefarious party can nonetheless be unable to gain access to the underlying information included in the first field and the second field because the first field and the second field are encrypted.

According to an embodiment, a consuming device can receive the encrypted message. The consuming device can decrypt the encrypted first field of the encrypted message using the first DEK from among the first group of DEKs that allows access by the consuming device to a first portion of the set of fields. The consuming device can decrypt the encrypted second field of the message using the second DEK from among the second group of DEKs that allows access by the consuming device to a second portion of the set of fields. The consuming device can display the message including the set of fields. In this way, the consuming device can access various fields of the message based on the consuming device having access to one or more groups of DEKs that can decrypt the respective fields and that access to various portions of fields of the message.

The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 is a diagram of an example system 100 for field-level encryption and decryption of messages using multiple groups of DEKs. As shown in FIG. 1, the system 100 can include a producing device 110, a stream processing platform 120, a consuming device 130, a key management system 140, a schema storage system 150, and a network 160.

The producing device 110 can be configured to generate a message. For example, the producing device 110 can be a server, a smartphone, a desktop computer, a laptop computer, a wearable device, or the like.

The stream processing platform 120 can be configured to perform stream processing including the message. For example, the stream processing platform 120 can be a server, a cloud server, or the like. As a particular example, the stream processing platform 120 can be Apache Kafka®, Apache Spark®, Confluent®, RabbitMQ®, or the like.

The consuming device 130 can be configured to display the message. For example, the consuming device 130 can be a server, a smartphone, a desktop computer, a laptop computer, a wearable device, or the like.

The key management system 140 can be configured to store key encryption keys (KEKs). For example, the key management system 140 can be a server, a cloud server, a database, or the like. As a particular example, the key management system 140 can be Google Key Management Service®, Amazon Web Services Key Management Service®, or the like. The encryption can be based on Authenticated Encryption with Associated Data (AEAD), which is the wrapper on top of a symmetric key algorithm (e.g., AES256-GCM).

The schema storage system 150 can be configured to store a schema. For example, the schema storage system 150 can be a server, a cloud server, a database, or the like.

The network 160 can be configured to permit communication between the producing device 110, the stream processing platform 120, the consuming device 130, the key management system 140, and the schema storage system 150. For example, the network 160 can be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of the devices of the system 100 shown in FIG. 1 are provided as an example. In practice, the system 100 can include additional devices, fewer devices, different devices, or differently arranged devices than those shown in FIG. 1. Additionally, or alternatively, a set of devices (e.g., one or more devices) of the system 100 can perform one or more functions described as being performed by another set of devices of the system 100.

Figure 2:
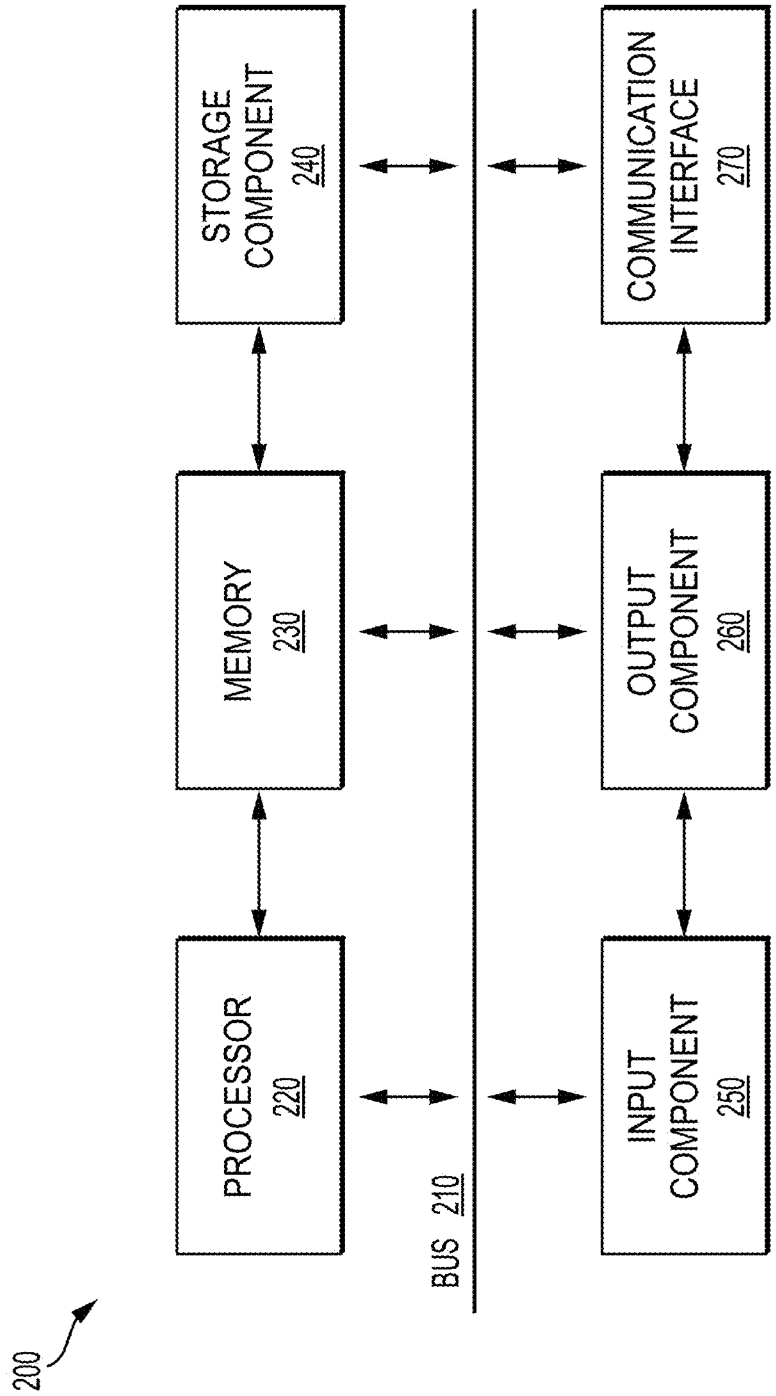
FIG. 2 is a diagram of example components of a device for field-level encryption and decryption of messages using multiple groups of DEKs.

FIG. 2 is a diagram of example components of a device 200 for field-level encryption and decryption of messages using multiple groups of DEKs. The device 200 can correspond to the producing device 110, the stream processing platform 120, the consuming device 130, the key management system 140, and/or the schema storage system 150.

As shown in FIG. 2, the device 200 can include a bus 210, a processor 220, a memory 230, a storage component 240, an input component 250, an output component 260, and a communication interface 270.

The bus 210 includes a component that permits communication among the components of the device 200. The processor 220 can be implemented in hardware, firmware, or a combination of hardware and software. The processor 220 can be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 220 can include one or more processors capable of being programmed to perform a function. The memory 230 can include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 can store information and/or software related to the operation and use of the device 200. For example, the storage component 240 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 can include a component that permits the device 200 to receive information, such as via user input (e.g., a touch screen display, a keyboard, a keypad, a mouse, a button, a switch, and/or a microphone for receiving the reference sound input). Additionally, or alternatively, the input component 250 can include a sensor for sensing information (e.g., a global positioning system (GPS) component, an accelerometer, a gyroscope, and/or an actuator). The output component 260 can include a component that provides output information from the device 200 (e.g., a display, a speaker for outputting sound at the output sound level, and/or one or more light-emitting diodes (LEDs)).

The communication interface 270 can include a transceiver-like component (e.g., a transceiver and/or a separate receiver and transmitter) that enables the device 200 to communicate with other devices, such as via a wired connection, a wireless connection, or a combination of wired and wireless connections. The communication interface 270 can permit the device 200 to receive information from another device and/or provide information to another device. For example, the communication interface 270 can include an Ethernet interface, an optical interface, a coaxial interface, an infrared interface, a radio frequency (RF) interface, a universal serial bus (USB) interface, a Wi-Fi interface, a cellular network interface, or the like.

The device 200 can perform one or more processes described herein. The device 200 can perform these processes based on the processor 220 executing software instructions stored by a non-transitory computer-readable medium, such as the memory 230 and/or the storage component 240. A computer-readable medium can be defined herein as a non-transitory memory device. A memory device can include memory space within a single physical storage device or memory space spread across multiple physical storage devices.

The software instructions can be read into the memory 230 and/or the storage component 240 from another computer-readable medium or from another device via the communication interface 270. When executed, the software instructions stored in the memory 230 and/or the storage component 240 can cause the processor 220 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the device 200 can include additional components, fewer components, different components, or differently arranged components than those shown in FIG. 2. Additionally, or alternatively, a set of components (e.g., one or more components) of the device 200 can perform one or more functions described as being performed by another set of components of the device 200.

Figure 3:
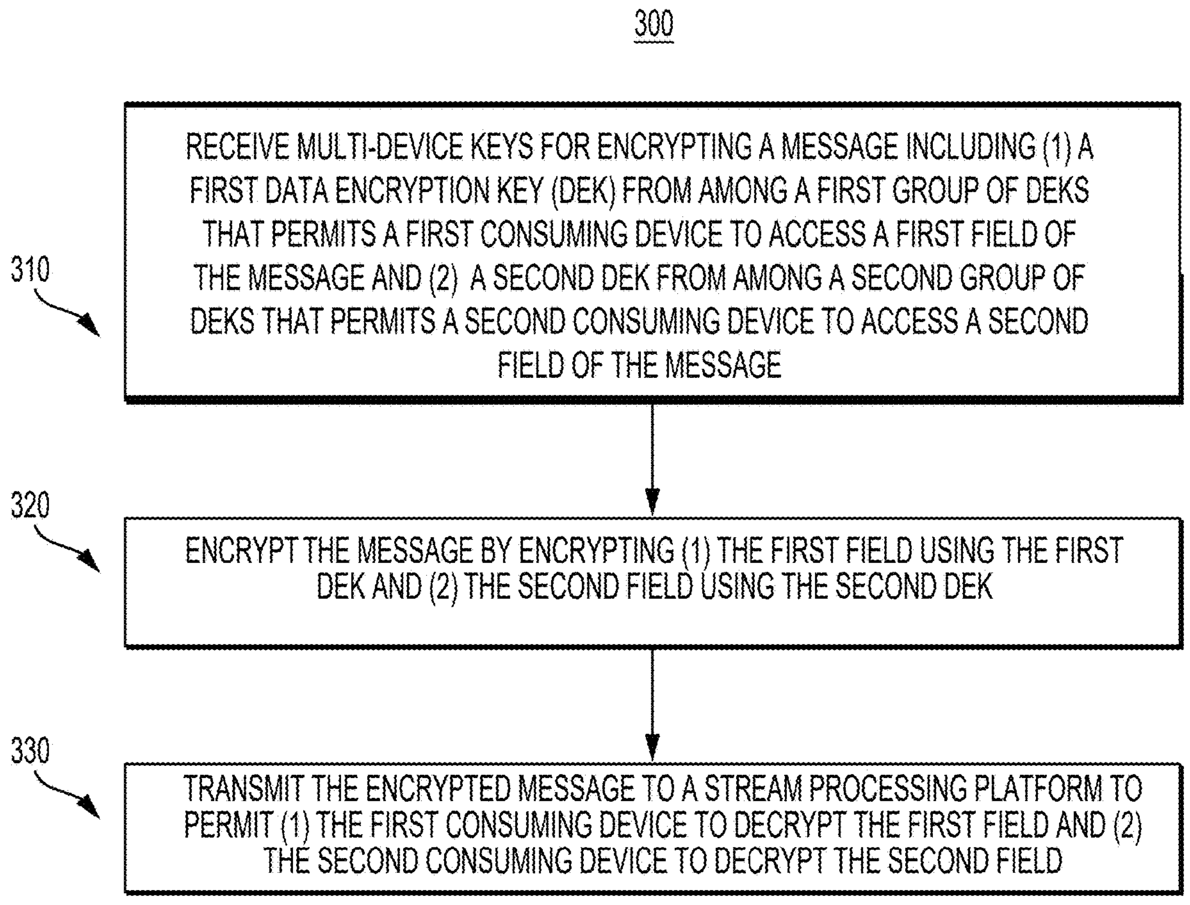
FIG. 3 is a flowchart of an example process for encrypting messages using multiple groups of DEKs.

FIG. 3 is a flowchart of an example process 300 for encrypting messages using multiple groups of DEKs. According to an embodiment, the producing device 110 can be configured to perform one or more blocks of the process 300. Additionally, or alternatively, one or more other devices of the system 100 can be configured to perform one or more blocks of the process 300.

As shown in FIG. 3 at block 310, the process 300 can include receiving multi-device keys for encrypting a message including (1) a first data encryption key (DEK) from among a first group of DEKs that permits a first consuming device to access a first field of the message and (2) a second DEK from among a second group of DEKs that permits a second consuming device to access a second field of the message. As an example, the message can be a medical message including protected health information (PHI) or personally identifiable information (PII). For example, the message can be an electronic health record (EHR), an electronic medical record (EMR), or the like. The set of fields can include a field for a patient name, a field for a patient address, a field for a patient medical condition, a field for a patient prescription, a field for a patient diagnosis, or the like.

The multi-device keys may include (1) a first DEK from among a first group of DEKs that permits a first consuming device 130 to access a first field of the message and (2) a second DEK from among a second group of DEKs that permits a second consuming device 130 to access a second field of the message.

The producing device 110 can publish streams metadata to a stream catalog web portal. The streams metadata can identify streams of messages that the producing device 110 can generate, and that the consuming device(s) 130 can access. A consuming device 130 can browse the stream catalog web portal and subscribe to one or more specific streams and a set of fields of messages of the streams. The producing device 110 can approve the subscription contract, and inform the key management system 140 to generate multi-device keys for the contract. The producing device 110 can encrypt the messages of the stream with the multi-device keys and send to the stream processing platform 120. The key management system 140 can authenticate the consuming device 130 and transmit the multi-device keys to the consuming device 130. The consuming device 130 can decrypt messages of the stream from the stream processing platform 140 using the multi-device keys that are authorized by the contract.

The first group of DEKs can allow a consuming device 130 to access a first portion of the set of fields. The first portion can be some, or all, of the fields of the message. For example, if the message includes n fields, then the first portion can be n fields or m fields. As a particular example, if the message includes ten fields, then the first portion can be one field, two fields, etc.

The second group of DEKs can allow a consuming device 130 to access a second portion of the set of fields. The second portion can be some, or all, of the fields of the message. For example, if the message includes n fields, then the second portion can be n fields or p fields. As a particular example, if the message includes ten fields, then the first portion can be one field, two fields, etc. The second portion can be different than the first portion.

As further shown in FIG. 3 at block 320, the process 300 can include encrypting the message by encrypting (1) the first field using the first DEK and (2) the second field using the second DEK.

In this way, a consuming device 130 can access some, or all, of the fields of the message based on which group, or groups, of DEKs the consuming device 130 can access.

According to an embodiment, the producing device 110 can encrypt the first field using a serializer, and can encrypt the second field using the serializer. The serializer can be configured to encrypt fields of the message.

According to an embodiment, the producing device 110 can receive a schema from the schema storage system 150, and determine the first field and the second field to encrypt using the schema. The producing device 110 can have access to a plurality of groups of DEKs that respectively allow access to various portions of fields of the messages. Each group of the groups of DEKs can include a plurality of DEKs and can allows access to different portions of the fields of the messages and/or allows access to different fields of the messages. The producing device 110 can determine which fields of the set of fields to encrypt, and can determine which group of DEKs to use to encrypt the set of fields based on a schema. For example, the producing device 110 can receive a schema from the schema storage system 150 that corresponds to a type of the message generated by the producing device 110, and determine fields of the set of fields to encrypt and determine which group of DEKs to use to encrypt the set of fields based on the schema.

According to an embodiment the producing device 110 can determine a particular DEK from among a particular group of DEKs to use to encrypt a field of the message. For example, the producing device 110 can encrypt a first field of the set of fields of the message using a first DEK from among a first group of DEKs that allows access by a consuming device 130 to a first portion of the set of fields. According to an embodiment, the producing device 110 can randomly select the first DEK from the first group of DEKs, select the first DEK based on an order of the DEKs in the first group of DEKs, select the first DEK using a selection algorithm, or the like. As another example, the producing device 110 can encrypt a second field of the set of fields of the message using a second DEK from among a second group of DEKs that allows access by a consuming device 130 to a second portion of the set of fields. The producing device 110 can encrypt an n-th field of the set of fields of the message using n or m groups of DEKs.

According to an embodiment, the producing device 110 can serialize the message including the encrypted first field and the encrypted second field for transmission over the network 160. For example, the producing device 110 can serialize, using a serializer, the message including the encrypted first field and the encrypted second field for transmission over the network 160. The producing device 110 can use the serializer to convert a data structure or object of the message into a format that can be stored by the stream processing platform 120 and/or transmitted over the network 160. According to an embodiment, the producing device 110 can serialize the message using the schema. For example, the schema can identify a format for serializing the message.

According to an embodiment, the producing device 110 can encrypt the first DEK or the second DEK using a KEK, and transmit the encrypted first DEK or the encrypted second DEK to the key management system 140. In this case, the encrypted first DEK can be referred to as a "wrapped DEK." The wrapped DEK can include the DEK that was used to encrypt a field of the message and that is encrypted by the KEK.

As further shown in FIG. 3 at block 330, the process 300 can include transmitting the encrypted message to a stream processing platform to permit (1) the first consuming device to decrypt the first field and (2) the second consuming device to decrypt the second field. The producing device 110 can transmit the message to the stream processing platform 120 for storage by the stream processing platform 120.

Figure 4:
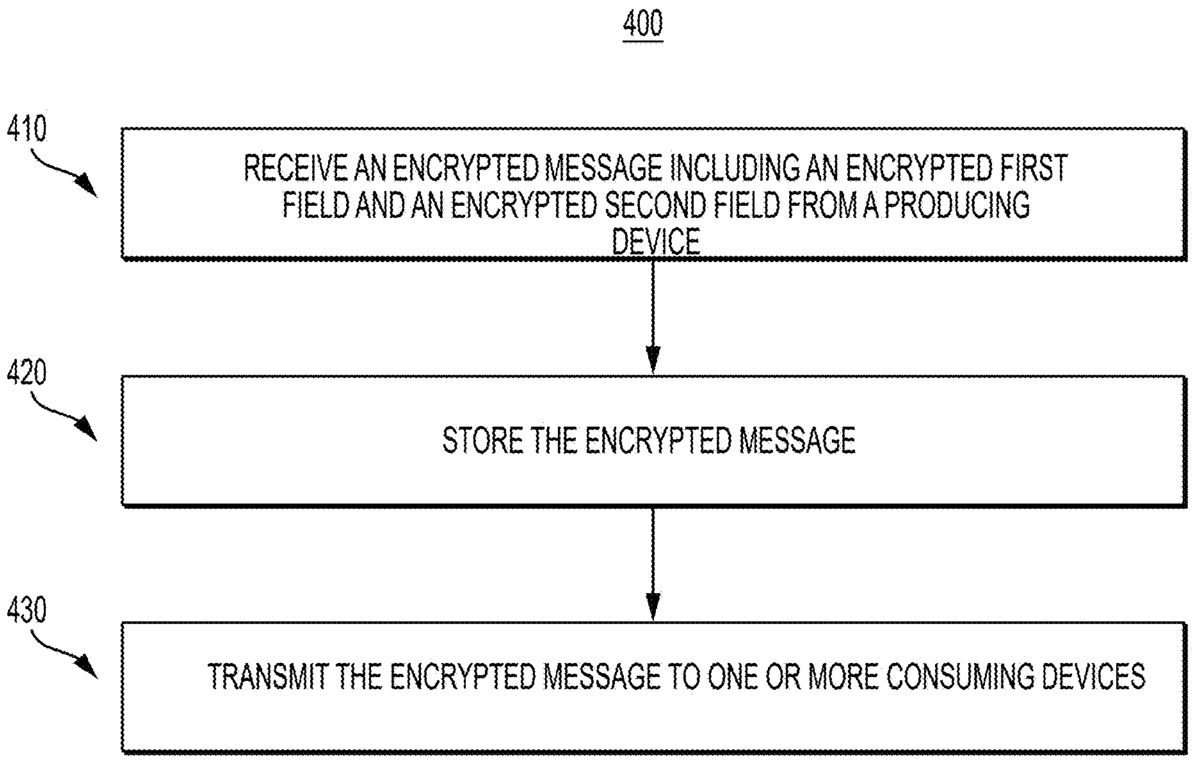
FIG. 4 is a flowchart of an example process for storing encrypted messages.

FIG. 4 is a flowchart of an example process 400 for storing encrypted messages. According to an embodiment, the stream processing platform 120 can be configured to perform one or more blocks of the process 400. Additionally, or alternatively, one or more other devices of the system 100 can be configured to perform one or more blocks of the process 400.

As shown in FIG. 4 at block 410, the process 400 can include receiving an encrypted message including an encrypted first field and an encrypted second field from a producing device. For example, the stream processing platform 120 can receive the encrypted message including the encrypted first field and the encrypted second field from the producing device 110.

As further shown in FIG. 4 at block 420, the process 400 can include storing the encrypted message. For example, the stream processing platform 120 can store the message including the encrypted first field and the encrypted second field from the producing device 110.

As further shown in FIG. 4 at block 430, the process 400 can include transmitting the encrypted message to one or more consuming devices. For example, the stream processing platform 120 can transmit the message to one or more consuming devices 130.

Figure 5:
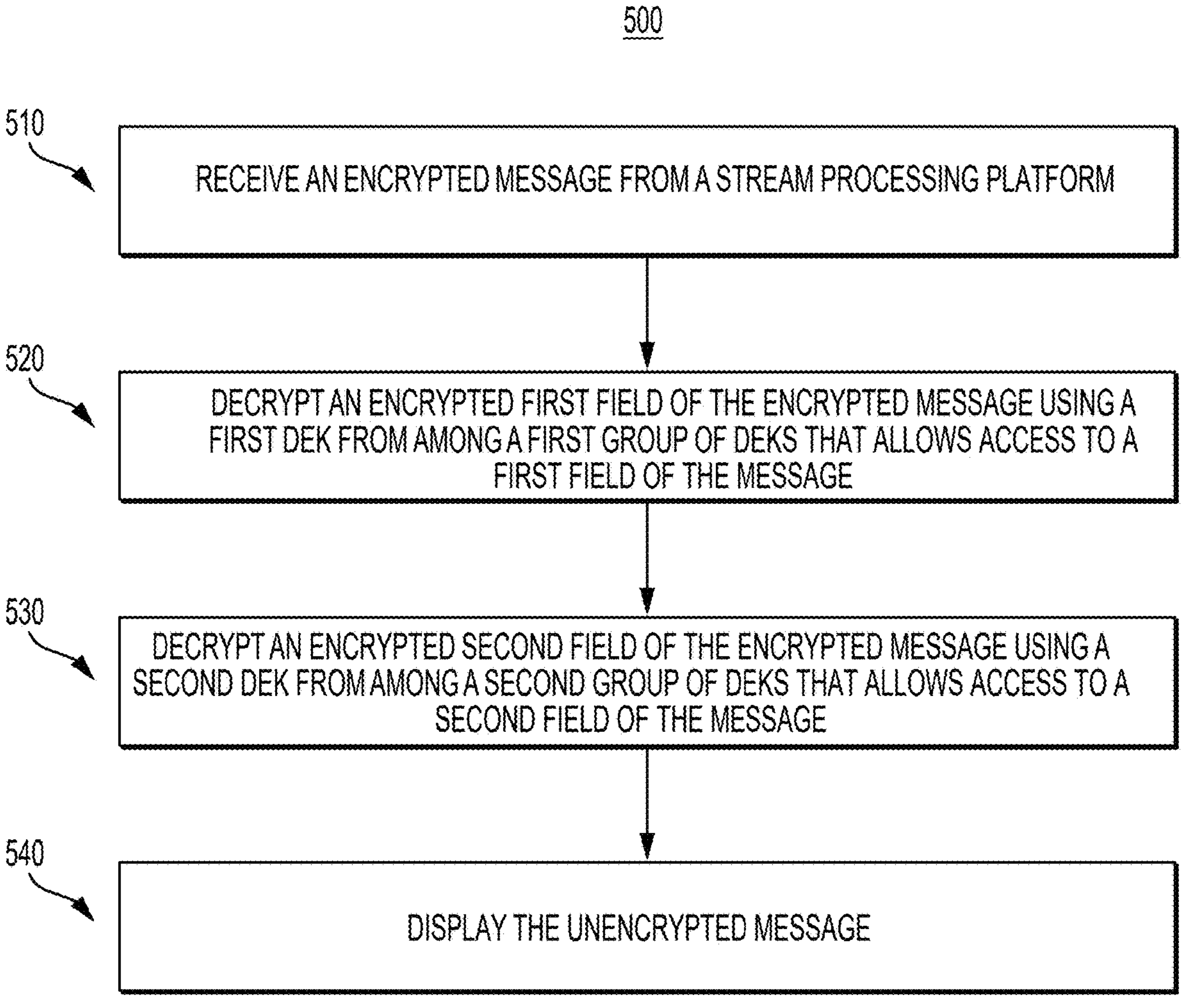
FIG. 5 is a flowchart of an example process for decrypting messages using multiple groups of DEKs.

FIG. 5 is a flowchart of an example process 500 for decrypting messages using multiple groups of DEKs. According to an embodiment, the consuming device 130 can be configured to perform one or more blocks of the process 500. Additionally, or alternatively, one or more other devices of the system 100 can be configured to perform one or more blocks of the process 500.

As shown in FIG. 5 at block 510, the process 500 can include receiving an encrypted message from a stream processing platform. For example, the consuming device 130 can receive an encrypted message from the stream processing platform 120.

According to an embodiment, the consuming device 130 can deserialize the encrypted message including the encrypted first field and the encrypted second field. For example, the consuming device 130 can deserialize, using a deserializer, the encrypted message including the encrypted first field and the encrypted second field. The consuming device 130 can use the deserializer to convert the encrypted message into a format that permits the decrypted message to be displayed via a display. According to an embodiment, the consuming device 130 can deserialize the encrypted message using the schema. For example, the schema can identify a format for deserializing the encrypted message.

According to an embodiment, the consuming device 130 can receive a DEK. For example, the consuming device 130 can transmit a request for a decrypted DEK to the key management system 140. In this case, the decrypted DEK can be referred to as an "unwrapped DEK." The key management system 140 can unwrap the wrapped DEK using the KEK, and transmit the unwrapped DEK to the consuming device 130.

According to an embodiment, the consuming device 130 can decrypt the first field using a deserializer, and can decrypt the second field using the deserializer. The deserializer can be configured to decrypt fields of the encrypted message.

According to an embodiment, the consuming device 130 can receive a schema from the schema storage system 150, and determine the first field and the second field to decrypt using the schema. The consuming device 130 can have access to a plurality of groups of DEKs. Each group of the groups of DEKs can include a plurality of DEKs, and can allows access to various portion of fields of the encrypted message. The consuming device 130 can determine which fields of the set of fields to decrypt, and can determine which group of DEKs to use to decrypt the set of fields based on a schema. For example, the consuming device 130 can receive a schema from the schema storage system 150 that corresponds to a type of the message generated by the producing device 110, and determine fields of the set of fields to decrypt and determine which group of DEKs to use to encrypt the set of fields based on the schema.

According to an embodiment the consuming device 130 can determine a particular DEK from among a particular group of DEKs to use to decrypt a field of the encrypted message. For example, the consuming device 130 can receive information that identifies the first DEK that was used by the producing device 110 to encrypt the first field. In this case, the consuming device 130 can decrypt an encrypted first field of the set of fields of the encrypted message using the first DEK from among a first group of DEKs that was used by the producing device 110 to encrypt the first field. The consuming device 130 can decrypt a second field of the set of fields of the encrypted message using a second DEK from among a second group of DEKs that was used to encrypt the second field. The producing device 110 can decrypt an n-th field of the set of fields of the encrypted message using the n-th DEK from among the n-th or m-th group of DEKs.

As further shown in FIG. 5 at block 520 and at block 530, the process 500 can include decrypting an encrypted first field of the encrypted message using a first DEK from among a first group of DEKs that allows access by a consuming device 130 to a first portion of the set of fields, and decrypting an encrypted second field of the encrypted message using a second DEK from among a second group of DEKs that allows access by a consuming device 130 to a second portion of the set of fields.

The consuming device 130 can access various portions of fields of the encrypted message based on the particular group, or groups, of DEKs that the consuming device 130 can access. For instance, if the producing device 110 encrypted one or more fields using a DEK from a first group of DEKs that allows access to a first portion (e.g., 60%) of the fields of the encrypted message and encrypted one or more fields using a DEK from a second group of DEKs that allows access to a second portion (e.g., 40%) of the fields of the encrypted message, then the consuming device 130 can access 100% of the fields of the encrypted message if the consuming device 130 has access to the first group of DEKs and the second group of DEKs, can access 60% of the fields of the encrypted message if the consuming device 130 has access to only the first group of DEKs, can access 40% of the fields of the encrypted message if the consuming device 130 has access to only the second group of DEKs, and can access none of the fields of the encrypted message if the consuming device 130 does not have access to the first group of DEKs and the second group of DEKs.

As further shown in FIG. 5 at block 540, the process 500 can include displaying the decrypted message. For example, the consuming device 130 can display the decrypted message. The message can be a medical message including PHI or PII. For example, the message can be an EHR, an EMR, or the like. The set of fields can include a field for a patient name, a field for a patient address, a field for a patient medical condition, a field for a patient prescription, a field for a patient diagnosis, or the like.

Figure 6:
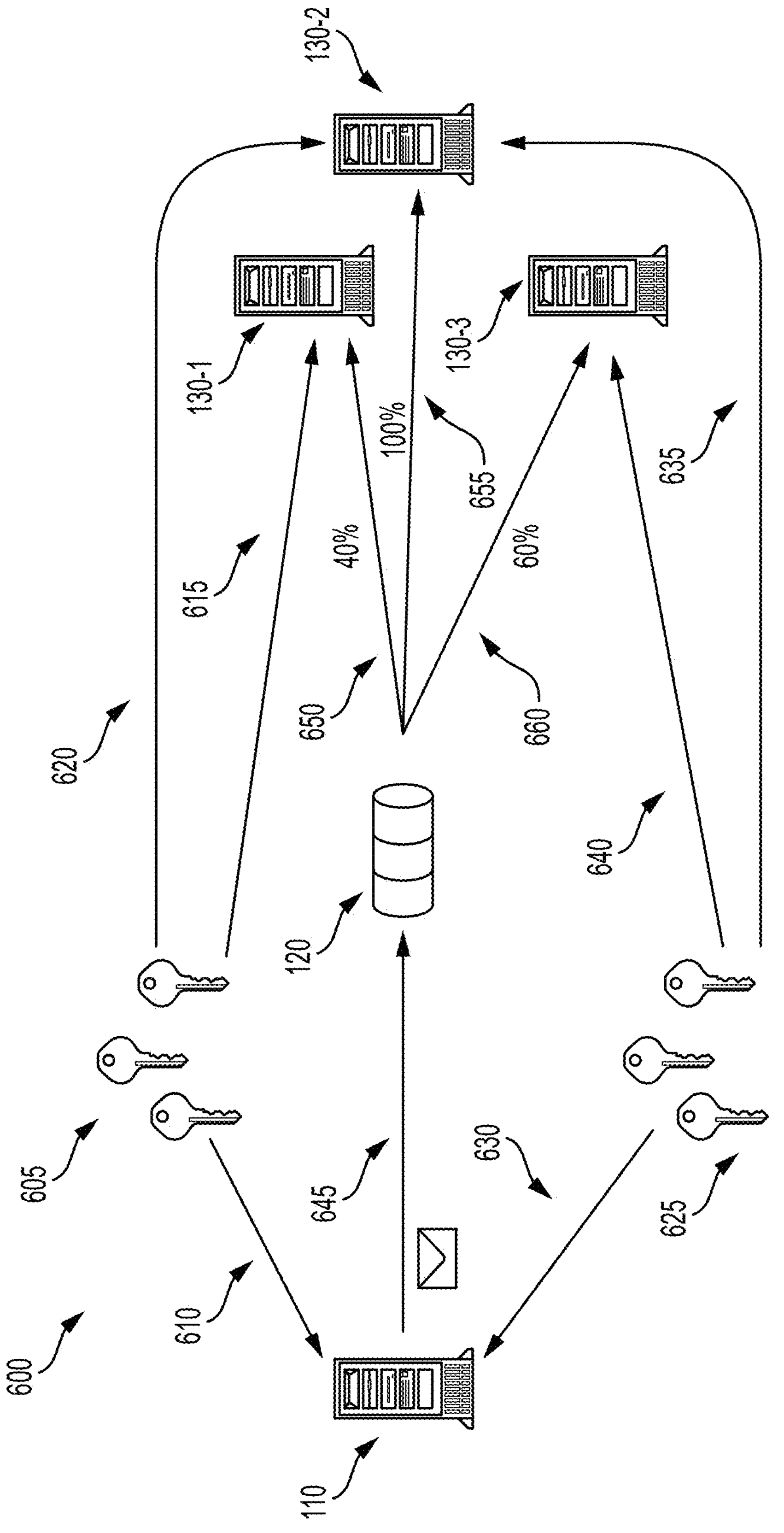
FIG. 6 is a diagram of an example process for field-level encryption by a producing device and decryption by multiple consuming devices of messages using multiple groups of DEKs.

FIG. 6 is a diagram of an example process 600 for field-level encryption by a producing device and decryption by multiple consuming devices of messages using multiple groups of DEKs.

As shown in FIG. 6, a first group 605 of DEKs can be accessible by a producing device 110 as shown by reference number 610, can be accessible by a first consuming device 130-1 as shown by reference number 615, can be accessible by a second consuming device 130-2 as shown by reference number 620, and can be inaccessible by a third consuming device 130-3.

As further shown in FIG. 6, a second group 625 of DEKs can be accessible by the producing device 110 as shown by reference number 630, can be inaccessible by the first consuming device 130-1, can be accessible by the second consuming device 130-2 as shown by reference number 635, and can be accessible by the third consuming device 130-3 as shown by reference number 640.

The producing device 110 can generate a message including a set of fields, and can encrypt, as an example, 40% of the fields using the first group 605 of DEKs and encrypt, as an example, 60% of the fields using the second group 625 of DEKs. As shown by reference number 645, the producing device 110 can transmit the encrypted message to a stream processing platform 120. It should be understood that the producing device 110 can encrypt any portion of fields using a DEK, and that the foregoing portions are examples.

As shown by reference number 650, the stream processing platform 120 can transmit the encrypted message to the first consuming device 130-1. The first consuming device 130-1 can access 40% of the fields of the message because the first consuming device 130-1 has access to the first group 605 of DEKs that encrypted 40% of the fields of the message.

As shown by reference number 655, the stream processing platform 120 can transmit the encrypted message to the second consuming device 130-2. The second consuming device 130-2 can access 100% of the fields of the encrypted message because the second consuming device 130-2 has access to the first group 605 of DEKs that encrypted 40% of the fields of the encrypted message and has access to the second group 625 of DEKs that encrypted 60% of the fields of the encrypted message.

As shown by reference number 660, the stream processing platform 120 can transmit the encrypted message to the third consuming device 130-3. The third consuming device 130-3 can access 60% of the fields of the message because the third consuming device 130-3 has access to the second group 625 of DEKs that encrypted 60% of the fields of the encrypted message.

Figure 7:
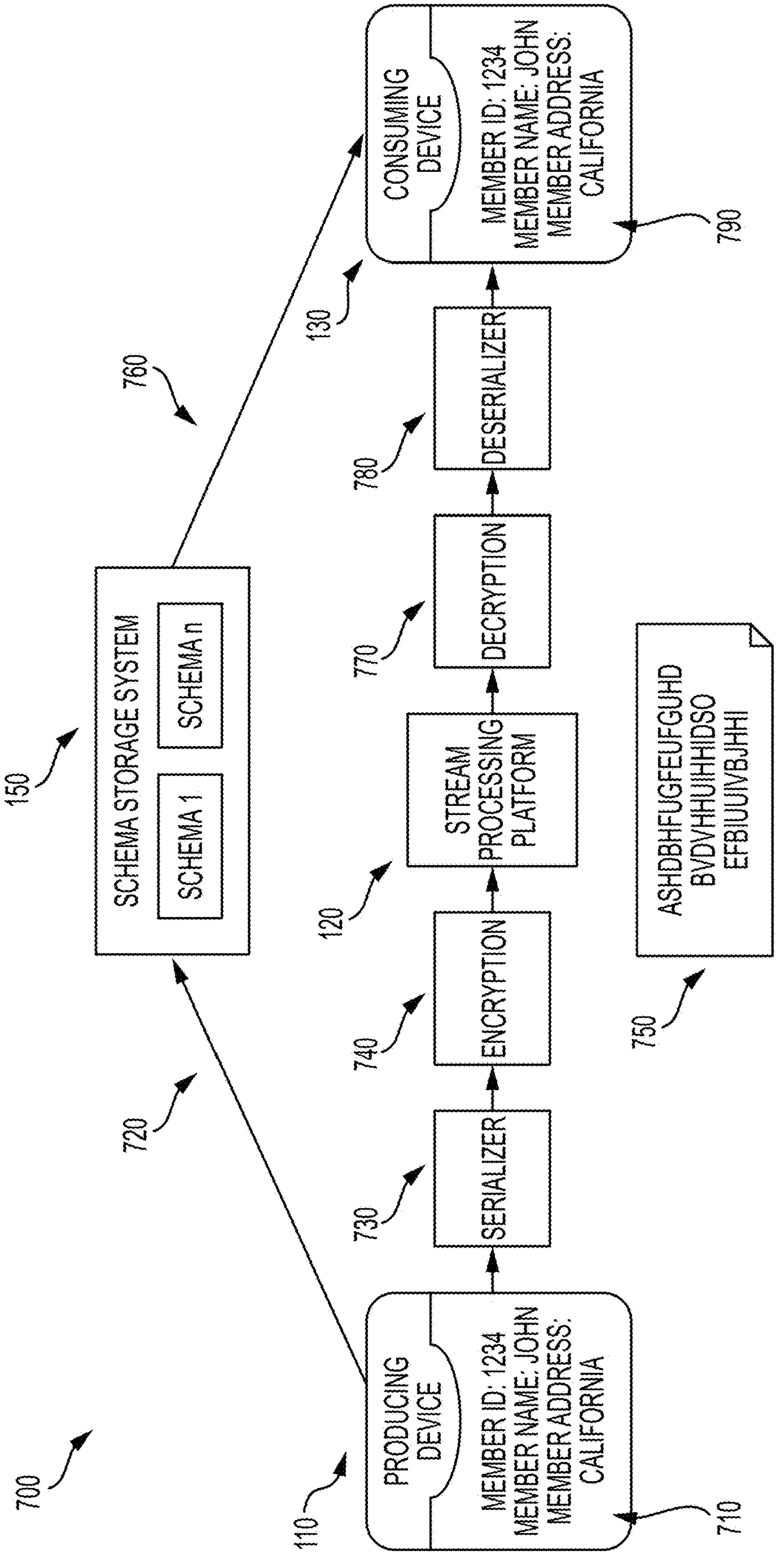
FIG. 7 is a diagram of an example process for field-level encryption by a producing device and decryption by a consuming device of messages using multiple groups of DEKs.

FIG. 7 is a diagram of an example process 700 for field-level encryption by a producing device and decryption by a consuming device of messages using multiple groups of DEKs. As shown in FIG. 7 by reference number 710, a producing device 110 can generate a message including a set of fields. As an example, the set of fields can include a "Member ID" field, a "Member Name" field, and a "Member Address" field. Each field can be associated with particular information. As shown by reference number 720, the producing device 110 can receive a schema from a schema storage system 150. As shown by reference number 730, the producing device 110 can use a serializer to serialize the message for transmission to a stream processing platform 120 using the schema. As shown by reference number 740, the producing device 110 can encrypt the set of fields using respective DEKs from among respective groups of DEK. The producing device 110 can transmit the message including the encrypted set of fields to a stream processing platform 120.

As shown by reference number 750, the stream processing platform 120 can store the encrypted message in an encrypted state. In this case, the underlying information associated with the set of fields might be inaccessible to a nefarious party because the information is encrypted. The stream processing platform 120 can transmit the encrypted message to a consuming device 130.

As shown by reference number 760, the consuming device can receive a schema from the schema storage system 150. As shown by reference number 770, the consuming device 130 can decrypt the set of fields using DEKs that were used to encrypt the message. As shown by reference number 780, the consuming device 130 can use a deserializer to deserialize the message to permit the message to be displayed using the schema. As shown by reference number 790, the consuming device 130 can display the decrypted message including the set of fields.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

Throughout this specification, components, operations, or structures described as a single instance may be implemented as multiple instances. Although individual operations of one or more methods (or processes, techniques, routines, etc.) are illustrated and described as separate operations, two or more of the individual operations may be performed concurrently or otherwise in parallel, and nothing requires that the operations be performed in the order illustrated. Structures and functionality (e.g., operations, steps, blocks) presented as separate components in example configurations may be implemented as a combined structure, functionality, or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, operations, blocks, or instructions. These may constitute and/or be implemented by software (e.g., code embodied on a non-transitory, machine-readable medium), hardware, or a combination thereof. In hardware, the routines, etc., may represent tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware component that operates to perform certain operations as described herein.

In various embodiments, a hardware component may be implemented mechanically or electronically. For example, a hardware component may comprise dedicated circuitry or logic that is permanently configured (e.g., as a special-purpose processor, such as a field programmable gate array (FPGA) or an application-specific integrated circuit (ASIC)) to perform certain operations. A hardware component may also or instead comprise programmable logic or circuitry (e.g., as encompassed within one or more general-purpose processors and/or other programmable processor(s)) that is temporarily configured by software to perform certain operations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where the hardware components include a general-purpose processor configured using software, the general-purpose processor may be configured as respective different hardware components at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple of such hardware components exist contemporaneously, communications may be achieved through signal transmission (e.g., over appropriate circuits and buses) that connect the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

As noted above, the various operations of example methods (or processes, techniques, routines, etc.) described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Moreover, each operation of processes illustrated as logical flow graphs may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The terms "coupled" and "connected," along with their derivatives, may be used. In particular embodiments, "connected" may be used to indicate that two or more elements are in direct physical or electrical contact with each other, although the context in the description may dictate otherwise when it is apparent that two or more elements are not in direct physical or electrical contact. "Coupled" may mean that two or more elements are in direct physical or electrical contact. However, "coupled" may also mean that two or more elements are not in direct contact with each other, yet still co-operate, transmit between, or interact with each other.

An algorithm may be considered to be a self-consistent sequence of acts or operations leading to a desired result. These include physical manipulations of physical quantities. Usually, though not necessarily, these quantities take the form of electrical, magnetic, or optical signals capable of being stored, transferred, combined, compared, and otherwise manipulated. These signals are commonly referred to as bits, values, elements, symbols, characters, terms, numbers, flags, or the like. It should be understood, however, that all of these and similar terms are to be associated with the appropriate physical quantities and are merely convenient labels applied to these quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "one embodiment," "an embodiment," "in some examples," or variations thereof means that a particular element, feature, structure, characteristic, operation, or the like described in connection with the embodiment is included in at least one embodiment, but not every embodiment necessarily includes the particular element, feature, structure, characteristic, operation, or the like. Different instances of such a reference in various places in the specification do not necessarily all refer to the same embodiment, although they may in some cases. Moreover, different instances of such a reference may describe elements, features, structures, characteristics, operations, or the like be combined in any manner as an embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless the context of use clearly indicates otherwise, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "set" is intended to mean a collection of elements and can be a null set (i.e., a set containing zero elements) or may comprise one, two, or more elements. A "subset" is intended to mean a collection of elements that are all elements of a set, but that does not include other elements of the set. A first subset of a set may comprise zero, one, or more elements that are also elements of a second subset of the set. The first subset may be said to be a subset of the second subset if all the elements of the first subset are elements of the second subset, while also being a subset of the set. However, if all the elements of the second subset are also elements of the first subset (in addition to all the elements of the first subset being elements of the second subset), the first subset and the second subset are a single subset/not distinct.

For the purposes of the present disclosure, the term "a" or "an" entity refers to one or more of that entity. As such, the terms "a" or "an", "one or more", and "at least one" can be used interchangeably herein unless explicitly contradicted by the specification using the word "only one" or similar. For example, "a first element" may functionally be interpreted as "a first one or more elements" or a "first at least one element." Unless otherwise apparent from the context of use, reference in the present disclosure to a same set of "one or more processors" (or a same "plurality of processors," etc.) performing multiple operations can encompass implementations in which performance of the operations is divided among the processor(s) in any suitable way. For example, "generating, by one or more processors, X; and generating, by the one or more processors, Y" can encompass: (1) implementations in which a first subset of the processors (e.g., in a first computing device) generates X and an entirely distinct, second subset of the processors (e.g., in a different, second computing device) independently generates Y; (2) implementations in which one or more or all of the processor(s) (e.g., one or multiple processors in the same device, or multiple processors distributed among multiple devices) contribute to the generation of X and/or Y; and (3) other variations. This may similarly be applied to any other component or feature similarly recited (e.g., as "a component", "a feature", "one or more components", "one or more features", "a plurality of components", "a plurality of features"). Moreover, the performance of certain of the operations may be distributed among the one or more components, not only residing within a single machine, but deployed across a number of machines. The set of components may be located in a single geographic location (e.g., within a home environment, an office environment, a cloud environment). In other example embodiments, the set of components may be distributed across two or more geographic locations. Further, "a machine-learned model", equivalent terms (e.g., "machine learning model," "machine-learning model," "machine-learned component", "artificial intelligence", "artificial intelligence component"), or species thereof (e.g., "a large language model", "a neural network") may include a single machine-learned model or multiple machine-learned models, such as a pipeline comprising two or more machine-learned models arranged in series and/or parallel, an agentic framework of machine-learned models, or the like.

An "artificial intelligence" or "artificial intelligence component" may comprise a machine-learned model. A machine-learned model may comprise a hardware and/or software architecture having structural hyperparameters defining the model's architecture and/or one or more parameters (e.g., coefficient(s), weight(s), biase(s), activation function(s) and/or action function type(s) in examples where the activation function and/or function type is determined as part of training, clustering centroid(s)/medoid(s), partition(s), number of trees, tree depth, split parameters) determined as a result of training the machine-learned model based at least in part on training hyperparameters (e.g., for supervised, semi-supervised, and reinforcement learning models) and/or by iteratively operating the machine-learned model according to the training hyperparameters(e.g., for unsupervised machine-learned models).

In some examples, structural hyperparameter(s) may define component(s) of the model's architecture and/or their configuration/order, such as, for example, the configuration/order specifying which input(s) are provided to one component and which output(s) of that component are provided as input to other component(s) of the machine-learned model; a number, type, and/or configuration of component(s) per layer; a number of layers of the model; a number and/or type of input nodes in an input layer of the model; a number and/or type of nodes in a layer; a number and/or type of output nodes of an output layer of the model; component dimension (e.g., input size versus output size); a number of trees; a maximum tree depth; node split parameters; minimum number of samples in a leaf node of a tree; and/or the like. The component(s) of the model may comprise one or more activation functions and/or activation function type(s) (e.g., gated linear unit (GLU), such as a rectified linear unit (ReLU), leaky RELU, Gaussian error linear unit (GELU), Swish, hyperbolic tangent), one or more attention mechanism and/or attention mechanism types (e.g., self-attention, cross-attention), nodes and split indications and/or probabilities in a decision tree, and/or various other component(s) (e.g., adding and/or normalization layer, pooling layer, filter). Various combinations of any these components (as defined by the structural hyperparameter(s)) may result in different types of model architectures, such as a transformer-based machine-learned model (e.g., encoder-only model(s), encoder-decoder model(s), decoder-only models, generative pre-trained transformer(s) (GPT(s))), neural network(s), multi-layer perceptron(s), Kolmogorov-Arnold network(s), clustering algorithm(s), support vector machine(s), gradient boosting machine(s), and/or the like. The structural parameters and components a machine-learned model comprises may vary depending on the type of machine-learned model.

Training hyperparameter(s) may be used as part of training or otherwise determining the machine-learned model. In some examples, the training hyperparameter(s), in addition to the training data and/or input data, may affect determining the parameter(s) of the target machine-learned model. Using a different set of training hyperparameters to train two machine-learned models that have the same architecture (i.e., the same structural hyperparameters) and using the same training data may result in the parameters of the first machine-learned model differing from the parameters of the second machine-learned model. Despite having the same architecture and having been trained using the same training data, such machine-learned models may generate different outputs from each other, given the same input data. Accordingly, accuracy, precision, recall, and/or bias may vary between such machine-learned models.

In some examples, training hyperparameter(s) may include a train-test split ratio, activation function and/or activation function type (e.g., in examples like Kolmogorov-Arnold networks (KANs) where the activation function type is determined as part of training from an available set of activation functions and/or limits on the activation function parameters specified by the training hyperparameters), training stage(s) (e.g., using a first set of hyperparameters for a first epoch of training, a second set of hyperparameters for a second epoch of training), a batch size and/or number of batches of data in a training epoch, a number of epochs of training, the loss function used (e.g., L1, L2, Huber, Cauchy, cross entropy), the component(s) of the machine-learned model that are altered using the loss for a particular batch or during a particular epoch of training (e.g., some components may be "frozen," meaning their parameters are not altered based on the loss), learning rate, learning rate optimization algorithm type (e.g., gradient descent, adaptive, stochastic) used to determine an alteration to one or more parameters of one or more components of the machine-learned model to reduce the loss determined by the loss function, learning rate scheduling, and/or the like.

In some examples, the structural hyperparameters and/or the training hyperparameters may be determined by a hyperparameter optimization algorithm or based on user input, such as a software component written by a user or generated by a machine-learned model. The machine-learned model may include any type of model configured, trained, and/or the like to generate a prediction output for a model input. In some examples, any of the logic, component(s), routines, and/or the like discussed herein may be implemented as a machine-learned model.

The machine-learned model may include one or more of any type of machine-learned model including one or more supervised, unsupervised, semi-supervised, and/or reinforcement learning models. Training a machine-learned model may comprise altering one or more parameters of the machine-learned model (e.g., using a loss optimization algorithm) to reduce a loss. Depending on whether the machine-learned model is supervised, semi-supervised, unsupervised, etc. this loss may be determined based at least in part on a difference between an output generated by the model and ground truth data (e.g., a label, an indication of an outcome that resulted from a system using the output), a cost function, a fit of the parameter(s) to a set of data, a fit of an output to a set of data, and/or the like. In some examples, determining an output by a machine-learned model may comprise executing a set of inference operations executed by the machine-learned model according to the target machine-learned model's parameter(s) and structural hyperparameter(s) and using/operating on a set of input data.

Moreover, any discussion of receiving data associated with an individual that may be protected, confidential, or otherwise sensitive information, is understood to have been preceded by transmitting a notice of use of the data to a computing device, account, or other identifier (collectively, "identifier") associated with the individual, receiving an indication of authorization to use the data from the identifier, and/or providing a mechanism by which a user may cause use of the data to cease or a copy of the data to be provided to the user.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

The present disclosure furthermore relates to the following aspects.

Example 1. A computer-implemented method may include receiving, by the one or more processors, multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message; encrypting, by the one or more processors, the message by encrypting (1) the first field using the first DEK and (2) the second field using the second DEK; and transmitting, by the one or more processors, the encrypted message to a stream processing platform to permit (1) the first consuming device to decrypt the first field and (2) the second consuming device to decrypt the second field.

Example 2. The method of Example 1, wherein encrypting the first field comprises encrypting the first field using a serializer, and wherein encrypting the second field comprises encrypting the second field using the serializer.

Example 3. The method of Examples 1 or 2, further comprising: receiving, by the one or more processors, a schema from a schema storage system; and determining, by the one or more processors, the first field and the second field to encrypt using the schema.

Example 4. The method of any of Examples 1-3, further comprising: serializing, by the one or more processors and using a serializer, the encrypted message including the encrypted first field and the encrypted second field.

Example 5. The method of Example 4, wherein serializing the message comprises serializing the message using a schema.

Example 6. The method of any of Examples 1-5, further comprising: encrypting, by the one or more processors, the first DEK or the second DEK using a key encryption key (KEK); and transmitting, by the one or more processors, the encrypted first DEK or the encrypted second DEK to a key management system.

Example 7. The method of any of Examples 1-6, wherein the message is a medical message including protected health information (PHI) or personally identifiable information (PII).

Example 8. A system may include one or more processors; and one or more memories storing processor-executable instructions that, when executed by the one or more processors, cause the one or more processors to perform operations comprising receiving multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message; encrypting the message by encrypting (1) the first field using the first DEK and (2) the second field using the second DEK; and transmitting the encrypted message to a stream processing platform to permit (1) the first consuming device to decrypt the first field and (2) the second consuming device to decrypt the second field.

Example 9. The system of Example 8, wherein encrypting the first field comprises encrypting the first field using a serializer, and wherein encrypting the second field comprises encrypting the second field using the serializer.

Example 10. The system of Examples 8 or 9, wherein the operations further comprise receiving a schema from a schema storage system; and determining the first field and the second field to encrypt using the schema.

Example 11. The system of any of Examples 8-10, wherein the operations further comprise: serializing, using a serializer, the encrypted message including the encrypted first field and the encrypted second field.

Example 12. The system of Example 11, wherein serializing the message comprises serializing the message using a schema.

Example 13. The system of any of Examples 8-12, wherein the operations further comprise: encrypting the first DEK or the second DEK using a key encryption key (KEK); and transmitting the encrypted first DEK or the encrypted second DEK to a key management system.

Example 14. The system of any of Examples 8-13, wherein the message is a medical message including protected health information (PHI) or personally identifiable information (PII).

Example 15. One or more non-transitory computer-readable media may store processor-executable instructions that, when executed by one or more processors, cause the one or more processors to perform operations comprising: receiving multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message; encrypting the message by encrypting (1) the first field using the first DEK and (2) the second field using the second DEK; and transmitting the encrypted message to a stream processing platform to permit (1) the first consuming device to decrypt the first field and (2) the second consuming device to decrypt the second field.

Example 16. The one or more non-transitory computer-readable media of Example 15, wherein encrypting the first field comprises encrypting the first field using a serializer, and wherein encrypting the second field comprises encrypting the second field using the serializer.

Example 17. The one or more non-transitory computer-readable media of Examples 15 or 16, wherein the operations further comprise: receiving a schema from a schema storage system; and determining the first field and the second field to encrypt using the schema.

Example 18. The one or more non-transitory computer-readable media of any of Examples 15-17, wherein the operations further comprise: receiving a schema from a schema storage system; and determining the first field and the second field to encrypt using the schema.

Example 19. The one or more non-transitory computer-readable media of any of Examples 15-18, wherein serializing the message comprises serializing the message using a schema.

Example 20. The one or more non-transitory computer-readable media of any of Examples 15-20, wherein the message is a medical message including protected health information (PHI) or personally identifiable information (PII).

We claim:

1. A computer-implemented method comprising:

receiving, by one or more processors, a schema that corresponds to a type of message;

receiving, by the one or more processors, multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message, the first group of DEKs having been determined from a plurality of groups of DEKs according to the schema;

encrypting, by the one or more processors, the message by encrypting (1) the first field using the first DEK and using a serializer and (2) the second field using the second DEK and using the serializer; and transmitting, by the one or more processors, the encrypted message to a stream processing platform to permit (1) the first consuming device to decrypt the first field and (2) the second consuming device to decrypt the second field.

2. The method of claim 1, further including encrypting a third field using the serializer and a third DEK from among the first group of DEKs that permits the first consuming device to access the third field of the message.

3. The method of claim 1, further comprising:

determining, by the one or more processors, the first field and the second field to encrypt using the schema.

4. The method of claim 1, further comprising:

serializing, by the one or more processors and using the serializer, the encrypted message including the encrypted first field and the encrypted second field.

5. The method of claim 4, wherein serializing the message comprises serializing the message using the schema.

6. The method of claim 1, further comprising:

encrypting, by the one or more processors, the first DEK or the second DEK using a key encryption key (KEK); and transmitting, by the one or more processors, the encrypted first DEK or the encrypted second DEK to a key management system.

7. The method of claim 1, wherein the message is a medical message including protected health information (PHI) or personally identifiable information (PII).

8. A system comprising:

one or more processors; and one or more memories storing processor-executable instructions that, when executed by the one or more processors, cause the one or more processors to perform operations comprising:

receiving a schema that corresponds to a type of message;

receiving multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message, the first group of DEKs having been determined from a plurality of groups of DEKs according to the schema;

encrypting the message by encrypting (1) the first field using the first DEK and using a serializer and (2) the second field using the second DEK and using the serializer; and transmitting the encrypted message to a stream processing platform to permit (1) the first consuming device to decrypt the first field and (2) the second consuming device to decrypt the second field.

9. The system of claim 8, further including encrypting a third field using the serializer and a third DEK from among the first group of DEKs that permits the first consuming device to access the third field of the message.

10. The system of claim 8, wherein the operations further comprise:

determining the first field and the second field to encrypt using the schema.

11. The system of claim 8, wherein the operations further comprise:

serializing, using the serializer, the encrypted message including the encrypted first field and the encrypted second field.

12. The system of claim 11, wherein serializing the message comprises serializing the message using the schema.

13. The system of claim 8, wherein the operations further comprise:

encrypting the first DEK or the second DEK using a key encryption key (KEK); and transmitting the encrypted first DEK or the encrypted second DEK to a key management system.

14. The system of claim 8, wherein the message is a medical message including protected health information (PHI) or personally identifiable information (PII).

15. One or more non-transitory computer-readable media storing processor-executable instructions that, when executed by one or more processors, cause the one or more processors to perform operations comprising:

receiving a schema that corresponds to a type of message;

receiving multi-device keys for encrypting a message, wherein the multi-device keys include (1) a first data encryption key (DEK) from among a first group of DEKs that permits a first consuming device to access a first field of the message and (2) a second DEK from among a second group of DEKs that permits a second consuming device to access a second field of the message, the first group of DEKs having been determined from a plurality of groups of DEKs according to the schema;

encrypting the message by encrypting (1) the first field using the first DEK and using a serializer and (2) the second field using the second DEK and using the serializer; and transmitting the encrypted message to a stream processing platform to permit (1) the first consuming device to decrypt the first field and (2) the second consuming device to decrypt the second field.

16. The one or more non-transitory computer-readable media of claim 15, further including encrypting a third field using the serializer and a third DEK from among the first group of DEKs that permits the first consuming device to access the third field of the message.

17. The one or more non-transitory computer-readable media of claim 15, wherein the operations further comprise:
determining the first field and the second field to encrypt using the schema.

18. The one or more non-transitory computer-readable media of claim 15, wherein the operations further comprise:
serializing, using the serializer, the encrypted message including the encrypted first field and the encrypted second field.

19. The one or more non-transitory computer-readable media of claim 18, wherein serializing the message comprises serializing the message using the schema.

20. The one or more non-transitory computer-readable media of claim 15, wherein the message is a medical message including protected health information (PHI) or personally identifiable information (PII).

* * * * *